Figure 1:
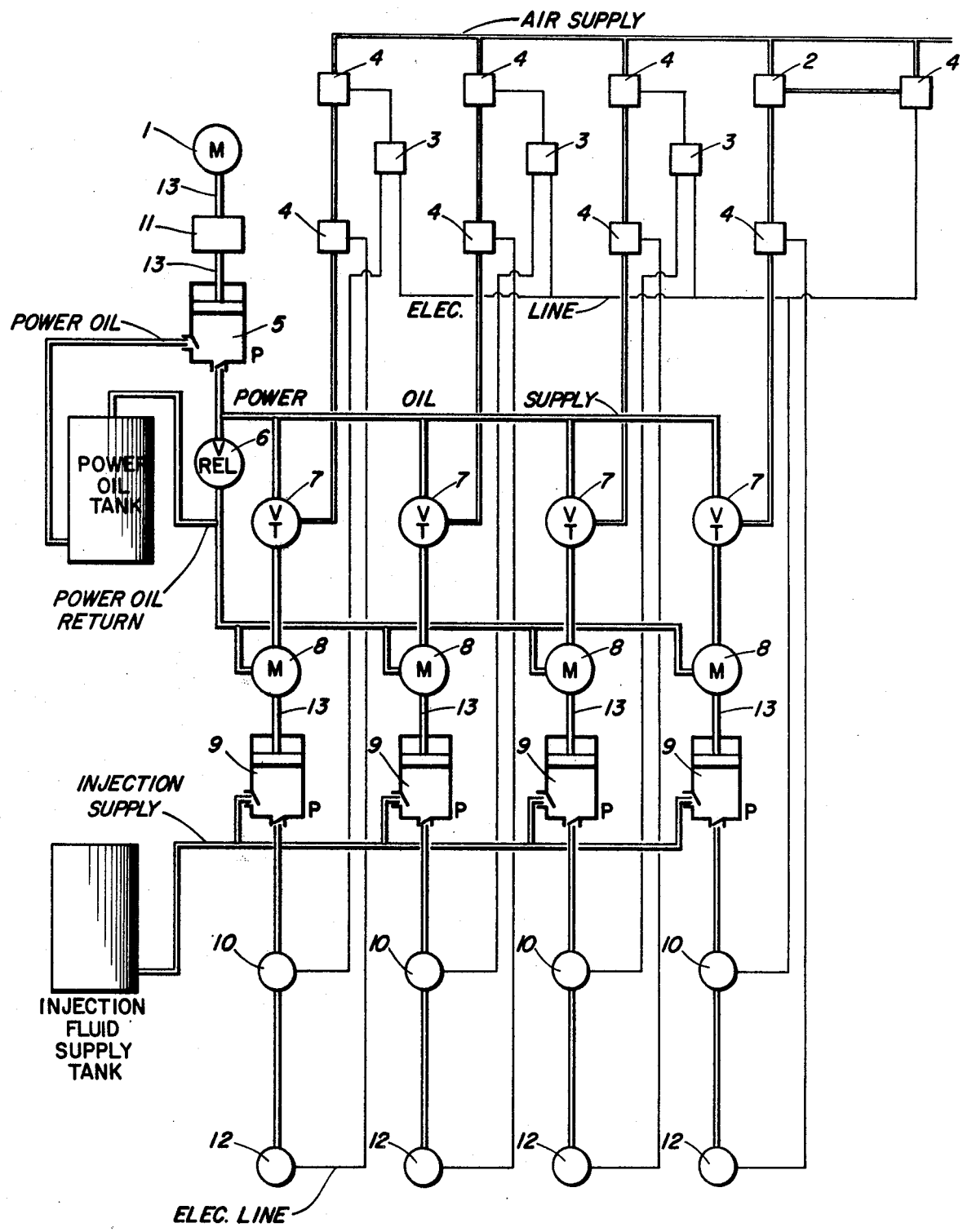

United States Patent [19]

Stalder

[11] 4,204,574
[45] May 27, 1980

[54] LOW SHEAR POLYMER INJECTION METHOD WITH RATIO CONTROL BETWEEN WELLS

[75] Inventor: John L. Stalder, New Orleans, La.

[73] Assignee: Conoco, Inc., Ponca City, Okla.

[21] Appl. No.: 888,728

[22] Filed: Mar. 21, 1978

Related U.S. Application Data

[63] Continuation-in-part of Ser. No. 835,609, Sep. 22, 1977, abandoned.

[51] Int. Cl.² ............................................. E21B 43/22
[52] U.S. Cl. ................................. 166/305 R; 166/53; 166/252; 166/275
[58] Field of Search ............................... 166/273–275, 166/305 R, 308, 53, 75, 295, 65 R, 250, 252

[56] References Cited

U.S. PATENT DOCUMENTS

| | | | |
|---|---|---|---|
| 3,371,714 | 3/1968 | Katzer | 166/305 R |
| 3,722,595 | 3/1973 | Kiel | 166/75 |
| 3,749,172 | 7/1973 | Hessert et al. | 166/274 |
| 3,893,510 | 7/1975 | Elphingstone et al. | 166/295 |
| 3,902,558 | 9/1975 | Watson, Jr. | 166/75 |
| 3,982,589 | 9/1976 | Wilson et al. | 166/53 |
| 4,042,025 | 8/1977 | Skinner et al. | 166/53 X |

Primary Examiner—Stephen J. Novosad
Attorney, Agent, or Firm—Cortlan R. Schupbach, Jr.

[57] ABSTRACT

A method for the insertion of shear degradable aqueous polymer solutions in a polymer thickened flood wherein a series of pumps are used in a multi-branch system, while reducing shear degradation while maintaining pressure and rate control within any branch of said multibranch system comprising utilizing hydraulic drivers for the pumps wherein the hydraulic power source for the drivers is controlled (a) by a pressure sensing loop such that a selected preset pressure will not be exceeded by any branch of the injection system, and (b) by a rate proportioning control loop whereby the injection rate in the various branches of the multi-branch system will be maintained in a given proportion to one another regardless of rate changes in a designated master branch or in the total injection stream. Polymer shear rates are reduced by using plunger pumps, progressive cavity pumps, diaphram pumps or other low shear pumps for the polymer injection while utilizing throttle valves and hydraulic pumps for the hydraulic oil power system. An optional manually controlled variable speed drive can minimize the amount of by-passed hydraulic power oil.

6 Claims, 2 Drawing Figures

LOW SHEAR POLYMER INJECTION METHOD WITH RATIO CONTROL BETWEEN WELLS

This application is a continuation-in-part of application Ser. No. 835,609 filed Sept. 22, 1977, now abandoned.

This invention deals with a method of maintaining ratio control with pressure override in a low shear rate injection system. More particularly, this system deals with a system utilizing a hydraulic power oil system to drive individual hydraulic motors connected to low shear rate pumps, all connected to a feedback system such that individual injection pump rates are held in fixed proportion automatically with pressure override compensation, regardless of rate variations in the system.

Use of polymers which require pumping have long been known in many areas. Such polymers are useful in such widely diverse areas as the food industry and in tertiary oil recovery. Polymers such as polyacrylamides have been used for years to reduce the amount of water production from oil wells by means of injection a solution of polymer into a subterranean formation thereby reducing the permeability of the formation of water. Representative examples of such techniques can be found in U.S. Pat. Nos. 3,749,172 and 3,893,510. Hydrocarbon-water ratios of oil and gas wells have been improved using such polymers. Such polymers have also been used to change the injectivity profile of water injection wells to make more efficient use of the water and to change the mobility of said injected water.

Such polymers, in order to be effective, require that they reach the producing formation in an essentially unchanged state. However, for many polymers such as polyacrylamides, the mere process of pumping and controlling injection degrades the polymers since these polymers are very susceptible to shear degradation. Polymer passing through throttle valves and centrificil pumps is often greatly reduced in effectiveness.

Injection of these polymers using piston-type pumps has heretofore been attempted but such pumps do not allow the easily automated rate control possible with other pumps which inherently produce a high shear rate.

It would therefore be of great benefit to provide a method whereby ratio control with pressure override, combined with low shear rate injection, could be maintained.

It is therefore an object of the present invention to provide an automated rate proportioning and pressure override control of injection fluid when separate pumps must be used on various injection streams. Other objects will become apparent to those skilled in this art as the description proceeds. The present invention provides in the injection of shear degradable aqueous polymer solutions in a polymer thickened flood, wherein a series of pumps are used in a multi-branch system, a method of reducing shear degradation while maintaining pressure and rate control within any branch of said multi-branch system by utilizing hydraulic drivers for the pumps wherein the hydraulic power source for the drivers is controlled (a) by pressure sensing loop such that a selected pre-set pressure will not be exceeded by any branch of the injection system, and (b) by a rate proportioning control loop whereby the injection rate in the various branches of the multi-branch system will be maintained in a given proportion to one another regardless of rate changes in a designated master branch or in the total injection system.

The pumps handling the polymer solutions are usually plunger pumps, progressive cavity pumps, or diaphram pumps. Other low shear pumps which can be used are known to those skilled in the art. Representative examples of plunger-type pumps are those manufactured by the Milton-Roy Manufacturing Company, and examples of progressive cavity pumps are those known as Moyno pumps, all well-known to those skilled in this art.

The types of polymers most useful in the practice of the present invention are shear degradable polymers. However, it will be apparent to one skilled in the art that any polymer susceptible to any injection can be utilized in the practice of the instant invention. Representative examples of these polymers are described in patent application Ser. No. 739,418, filed Nov. 8, 1976, now U.S. Pat. No. 4,064,940, hereby incorporated by reference.

Figure 2:
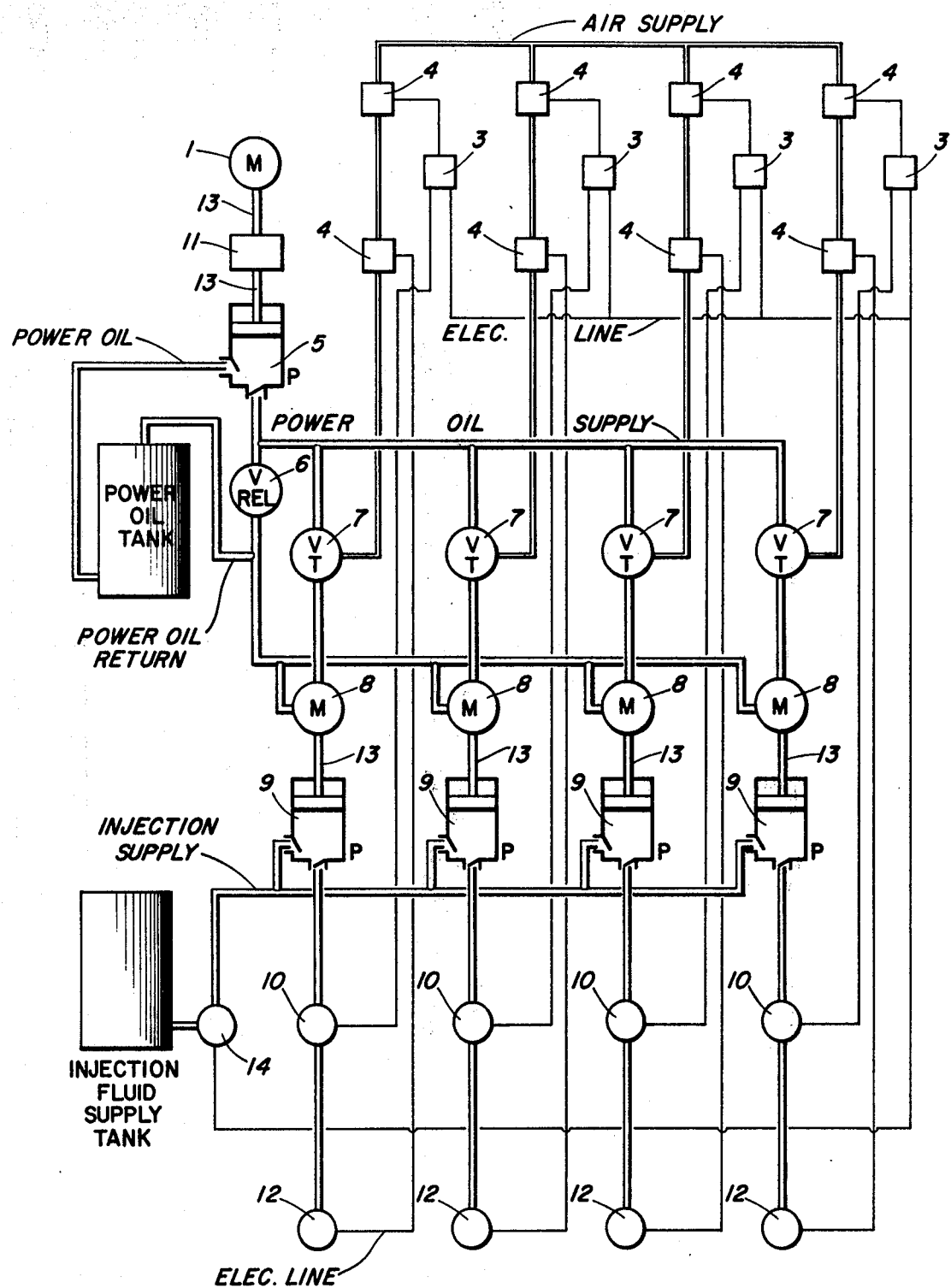

The invention is described with reference to two figures. Briefly described, FIG. 1 is a schematic of a multi-branch system having three branches as well as a master control injection well. It will be apparent that the number of branches can be varied to fit the needs of a particular situation. FIG. 2 describes a system wherein the total injection stream is used as a reference point.

The invention is more concretely described with reference to the detailed description of the drawings.

With reference to FIG. 1, separate sources of power oil and injection fluid are maintained. Power to the entire system is delivered by an electric motor (1) which drives a drive shaft (13) operating a hydraulic power oil pump (5). The hydraulic power oil pump (5) circulates power oil through the system and the power oil reservoir. The power oil travels from the pump (5) through throttling valves (7) and therefrom into hydraulic motors (8). After passing through the motor, the oil returns to the power oil tank for recirculating. The hydraulic motors transmit power through shafts (13) to low shear pumps (9). These pumps, as described above, can be plunger pumps, progressive cavity pumps, or diaphragm pumps. These pumps obtain an injection fluid from a supply reservoir and inject the fluid through a turbine meter system (10). The turbine meters have frequency outputs which can be converted to analogue output using a frequency to current (or pneumatic) converter. The fluid then passes on into the injection well where a pressure sensor (12) converts the pressure sensed into an electrical current. Simultaneously, an air supply passes through a conduit to pneumatic converter (4) which is controlled by a ratio controller (3). The ratio controller receives the analogue output from the turbine meter (10) and adjusts the flow or air controlling the throttle valve which regulates the hydraulic flow to the motors. Thus the ratio controller (3) reading the analogue output from the turbine meter (10) is the primary rate control. Electrical currrent to the pneumatic converter (4) reads the current produced by the pressure sensor (12) and throttles back the amount of power oil flowing through the throttle valve (7) if the preset pressure on the pneumatic controller (4) is exceeded. The ratio controller (3) operates only from the rate input derived from the various turbine meters in the system in which frequency outputs are converted to analogue using a frequency-to-current or pneumatic converter and thus controls the power flow by adjusting the hydraulic flow through the throttle valve (7).

The turbine meter producing analogue output (10) as described above reads the flow of fluid and reports, using electrical current, to a pneumatic converter (4). No pressure data ties directly into the ratio controllers.

Thus it is apparent that the present system powers hydraulic motors which, operating through the drive shafts (13), control the low shear pumps (9), thus allowing adequate control of polymer rate and pressure in the wells while maintaining low shear degradation. The system, as illustrated in the drawing, utilizes a hydraulic power oil system to drive individual hydraulic motors connected to low shear rate pumps. The power oil supply rate to each motor is modulated by the pressure sensing control loop to insure that a presettable pressure will not be exceeded in any particular branch of the injection system. In addition, a control signal is derived from a rate sensing control loop which may be located on a key (or master) branch of the injection system or on the total injection stream upstream of the individual pumps. This signal is fed into a ratio controlling device to derive a controlling signal for each of the other branches of the injection system. Controlling signals so derived are used to further modulate the hydraulic power oil supply driving each individual hydraulic motor. In this way the individual injection pump rates are held in fixed proportion to each other, automatically, with pressure override compensation regardless of rate variations either manually induced in the master well via pneumatic indicating controller 2 or arising due to other factors influencing the system. It is apparent that this system will solve the problem providing automated rate proportioning and pressure overriding control of injection fluid when separate pumps must be used on various injection streams.

While the polymer and water are shown in a premixed state in the injection fluid reservoir, polymer and diluting fluid can be mixed during injection using the method of the instant invention. Only minor variations from the system described are necessary.

Further examination of the drawing will show that between the electric motor (1) and the hydraulic power oil pump (5) is inserted a manually variable speed drive (11). This device is an optional insertion into the system but will allow much more efficient use of the power oil flowing through the system. Normally a small fraction of the volume of oil needed to power the hydraulic motors is maintained in reserve. However, during extended periods of low demand, maintaining the pressure on this excess oil will be costly and provide no benefit. Therefore it would be of benefit to allow manual control of the amount of power oil flowing through the system, such control being provided by the manually variable speed drive on the electric motor.

The system illustrated in FIG. 1 is one of two basic systems possible with the control concept of the instant application. The two variations differ only in that the one illustrated in FIG. 1 has one master control well and a ratio controller for each of the other wells in the system. Alternatively, the system would have no designated "master control well" but would have a ratio controller on every well in the system. Thus it is clear that the basic difference between the two lies only in the origin of the signal fed into the ratio controllers.

In the "master control well" approach this signal is the injection rate into the master well as measured by the turbine meter on that well. Reference again is made to FIG. 1 wherein the turbine meter analogue output (10) on the master control well (furthest well to the right in the diagram) is fed directly into the signal input in each of the ratio controllers for the remaining wells in the system. Thus any variation in the master well rate, whether manually introduced through the pneumatic indicating controller (2) or automatically introduced by the master well pressure system reducing the rate in the master well or mechanically introduced by pump failure, line plugging, equipment failure, or other causes will change the rates in the other wells to vary in proportion to the master well rate (via the ratio controllers). The desired proportion to the master well rate is manually set in the ratio controllers for each well. The pressure control systems in each of the wells controlled by the master well may then throttle that particular well back in which case that well will no longer be in proportion to the master well. Thus it is preferred to designate as the master well that well most likely to be throttled back by pressure override. This is the case because only in a master well will injection rates remain in proportion while pressure throttling is occurring. When the proper well is designated as the master control well, proper proportions can be maintained except in rare instances and even then can easily be manually corrected. The system is designed to allow setting the rate manually in the master control well using the pneumatic indicating controller (2). This rate ordinarily will be below the critical rate of the well which would result in pressure control override of the manually set rate. Therefore, the pressure override is not normally in use, but when in use will pressure throttle the master control wells such that all wells will respond in proportion, thus maintaining injection balance.

It is useful to have an interface (4, current to pneumatic converter or equivalent) between the master control well turbine meter analogue output (10) and the pneumatic indicating controller (2) in the master well. The purpose of this interface is to dampen unwanted variations in the master control well injection rate arising from pump pressure variations, well back pressure, or any other conditions which would tend to introduce noise in the master well's injection rate. This interface would automatically dampen the variations, the most serious source of which would be in searching of the throttling valve on the master control well, said searching being picked up by the other wells which would result in an unstable control system.

Another variation of the control system, illustrated in FIG. 2, would derive its signals from the sum of all meters on the various injection wells or from a meter (14) placed in the line from the injection fluid supply tank leading up to the injection pumps. In this embodiment, no single well serves as a reference control point but rather the total injection stream serves as a reference control point. For example, if one well is not more likely than any of the other wells to be rate limited due to injection pressure limitations, this system would be utilized as all wells would stay in proportion regardless of which well became the limiting well. One disadvantage of this embodiment is that some control sensitivity will be sacrificed in accomplishing the rate variations. Therefore it is clear that where one well is more likely than the others to be the limiting well, the greater sensitivity of the first embodiment described would outweigh the greater versatility of the second embodiment in polymer flood operations.

It is clear that the instant invention describes a pressure override such that no on-off control is exerted, rather a proportional throttling back of injection on a well as the pressure increases and approaches a critical cutoff point. Therefore if one well begins to throttle back due to pressure feedback and if the total injection stream is used for the ratio controller signal rather than using a master control well for the signal, then each ratio controller will adjust the rates flowing to their respective wells in proportion to the rate decrease in the total injection stream. Thus the various injection rates stay in proportion even though a well is being throttled back by the pressure sensing systems.

The present system is useful in any situation wherein shear degradable synthetic polymers in multiple injection programs are used, especially where displacement efficiency depends upon injection rate and pressure controls within the individual injection sites. The system also overcomes the problems of using individually driven low shear plunger pumps and manual speed control since it eliminates manual adjustment and supervision of such a system. It is apparent that a large advantage is gained, especially when expanded systems are used, since manual control of large numbers of wells will be very complicated and costly.

Thus the instant invention provides both low shear handling of shear degradable polymers with automated proportioning of rates and pressure override where necessary, thereby overcoming many disadvantages of the prior art systems.

While certain embodiments and details have been shown for the purpose of illustrating this invention, it will be apparent to those skilled in this art that various changes and modifications may be made herein without departing from the spirit or the scope of the invention.

I claim:

1. In the injection of shear degradable aqueous polymer solutions in a polymer thickened flood wherein a series of pumps are used in a multi-branch system, a method of reducing shear degradation while maintaining pressure and rate control within any branch of said multi-branch system comprising utilizing hydraulic drivers for the pumps and controlling said drivers
   (a) by a pressure sensing loop such that a selected preset pressure will not be exceeded by any branch of the injection system, and
   (b) by a rate proportioning control loop whereby the injection rates in the various branches of the multi-branch system will be maintained in a given proportion to one another regardless of rate changes in a designated master branch or in the total injection stream.

2. A method as described in claim 1 wherein the injection stream uses low shear pumps for polymer injection.

3. A method as described in claim 2 wherein the injection steam uses plunger pumps, progressive cavity pumps, or diaphragm pumps.

4. A method as described in claim 1 wherein a manually variable speed drive controls power oil flow.

5. A method as described in claim 1 wherein an electric motor drives a hydraulic power oil pump which circulates a power oil supply through power oil throttling valves, speed of a hydraulic motor controlled by each valve, said hydraulic motors connected by a shaft to a low shear pump which draws injection fluid from a supply tank and injects said fluid through a turbine meter having analogue output into an injection well containing a pressure sensor and pressure to current converter, wherein a ratio controller receives analogue data from the rate input derived from the various turbine meters in the system, in which frequency outputs are converted to analogue using a frequency to current or pneumatic converter, and wherein the flow of power oil to the hydraulic motors is regulated by a throttle valve controlled by said ratio controller.

6. A method as described in claim 5 wherein in addition a manually variable speed drive transmits power between the electric motor and the hydraulic power oil pump.

* * * * *